United States Patent
Ortega

(10) Patent No.: US 12,512,882 B2
(45) Date of Patent: Dec. 30, 2025

(54) APPARATUS, METHOD, AND SYSTEM FOR PERFORMING MULTIPLE-USER MULTIPLE-INPUT MULTIPLE-OUTPUT COMMUNICATION, AND NON-TRANSITORY COMPUTER READABLE STORAGE MEDIUM

(71) Applicant: SAMSUNG ELETRÔNICA DA AMAZÔNIA LTDA., Amazonas (BR)

(72) Inventor: Alvaro Javier Ortega, Manaus (BR)

(73) Assignee: SAMSUNG ELETRÔNICA DA AMAZÔNIA LTDA., Amazonas (BR)

( * ) Notice: Subject to any disclaimer, the term of this patent is extended or adjusted under 35 U.S.C. 154(b) by 452 days.

(21) Appl. No.: 18/196,532

(22) Filed: May 12, 2023

(65) Prior Publication Data
US 2024/0162944 A1    May 16, 2024

(30) Foreign Application Priority Data
Nov. 4, 2022  (BR) ............... 10 2022 022459 5

(51) Int. Cl.
H04B 7/0452    (2017.01)
H04B 7/06      (2006.01)

(52) U.S. Cl.
CPC ......... *H04B 7/0452* (2013.01); *H04B 7/0691* (2013.01)

(58) Field of Classification Search
CPC ............... H04B 7/0452; H04B 7/0691
See application file for complete search history.

(56) References Cited

U.S. PATENT DOCUMENTS

| | | | |
|---|---|---|---|
| 9,647,735 B2 | 5/2017 | Sajadieh et al. | |
| 9,712,296 B2 | 7/2017 | Noh et al. | |
| 10,014,918 B2 | 7/2018 | Capar et al. | |
| 2021/0126669 A1* | 4/2021 | Roberts | H04L 5/14 |

OTHER PUBLICATIONS

Yiqi Lu et al., "Improved hybrid precoding scheme for mmWave large-scale MIMO systems", IEEE Access, vol. 7, pp. 12027-12034; Jan. 7, 2019.
Jing Jiang "Multi-user hybrid precoding for dynamic subarrays in mmWave massive MIMO systems", IEEE Access, vol. 7, pp. 101718-101728; Jul. 19, 2019.

* cited by examiner

*Primary Examiner* — Kwang B Yao
*Assistant Examiner* — Patrick Yipao Pei
(74) *Attorney, Agent, or Firm* — STAAS & HALSEY LLP

(57) ABSTRACT

A method and apparatus performing multiple user multiple input multiple output (MU-MIMO) communication. The apparatus comprising a hybrid precoder for channel precoding signals to be transmitted to a plurality of users through user channels. The hybrid precoder comprising a digital precoder configured to process signals digitally by a digital beamformer matrix, a plurality of radiofrequency chains and an analog precoder configured to process the signals analogically. The analog precoder comprises a grouped plurality of antennas to thereby allow building of the antennas' array as an array of several subarrays of antennas with each antenna is connected to a two-way switch, whose terminals are connected to a phase inverter and a multiple-way switch and the other terminal of the phase inverter is connected to the multiple-way switch. The number of terminals of the multiple-way switch is equal to the number of RF chains, so that each antenna subarray is switchable among the RF chains.

14 Claims, 10 Drawing Sheets
(6 of 10 Drawing Sheet(s) Filed in Color)

APPARATUS, METHOD, AND SYSTEM FOR PERFORMING MULTIPLE-USER MULTIPLE-INPUT MULTIPLE-OUTPUT COMMUNICATION, AND NON-TRANSITORY COMPUTER READABLE STORAGE MEDIUM

CROSS-REFERENCE TO RELATED APPLICATION(S)

This application is based on and claims priority under 35 U.S.C. § 119 to Brazilian Patent Application No. BR 10 2022 022459 5, filed on Nov. 4, 2022, in the Brazilian Intellectual Property Office, the disclosure of which is incorporated by reference herein in its entirety.

FIELD OF THE DISCLOSURE

The present invention refers to the telecommunication technology field. More specifically, it describes the proposed apparatus and method for implementing massive MIMO (multiple-input, multiple-output) in telecommunication devices, reducing the manufacturing cost and power consumption, and reaching a reliable and high energy-efficient communication.

DESCRIPTION OF RELATED ART

Emerging video streaming apps and other services have produced great interest from users to have high data speed transmissions. To satisfy this enormous throughput demand, the preferable wireless communication technique is MIMO, whose transmission can increase the radio link capacity at the same proportion as the number of antennas that is used. For this reason, this antenna technology has been implemented in several wireless communication standards, including, but not limited to, IEEE 802.11n (Wi-Fi), IEEE 802.11ac (Wi-Fi), HSPA+(3G), WiMAX, and Long-Term Evolution (LTE). However, most current commercial MIMO technologies use only a few antennas, which means that MIMO with a large number of antennas, which is known as massive MIMO, has not been broadly implemented until now. This fact represents a problem for present and future communication services because, as stated before, massive MIMO is required to satisfy the high data speed demand.

Millimeter-wave (mmWave) wireless communications have attracted significant interest due to their capacity to reach enormous data rate transmissions and solve the spectrum congestion problem. However, the higher path loss expected in mmWave scenarios results in severe link quality degradation, which can be mitigated using massive MIMO. The short wavelength of mmWave makes the antenna size small so that a large number of antenna elements can occupy a tiny area. Considering a rectangular space of 10 cm in length and 5 cm in width, using mmWave frequencies, whose wavelength varies from 1 to 10 mm, and being greedy, the number of antenna elements could be about 500. Therefore, hundreds or even thousands of antenna elements could be used in future smartphone devices that use mmWave frequencies, and in the base station, the number of antennas can be even larger. In addition, research in terahertz wireless communications is ongoing, where the wavelength size is given in micrometers, so in these scenarios, the number of antennas can be absurdly huge.

In low dimensional MIMO devices, each antenna is connected to a dedicated, expensive, and energy-intensive radio frequency (RF) chain, where a RF chain includes a low-noise amplifier, a down-converter, a digital to analog converter (DAC), an analog to digital converter (ADC) and so on, which is impractical or even prohibit when the number of antennas is large due to the high cost, power consumption, and limited space for the case of the users' terminals. As stated before, hundreds of antenna elements are expected in the next wireless devices, so hundreds of RF chains would be required. Therefore, the number of RF chains cannot have the same trend as the number of antennas. For this reason, new hardware architectures are required to implement massive MIMO in wireless devices. Since the signal processing is designed according to the hardware of the communication devices, conventional signal processing techniques are inadequate for the next wireless communications generation due to the hardware architecture would be different. Therefore, novel signal processing techniques that exploit these different hardware architectures are required.

There is a signal processing technique that is known as precoding or channel precoding, which must be performed in the transmitters to reduce the undesired effects caused by the channel conditions, e.g., the path loss; temporal obstructions between transmitter and receiver; in some cases, even rain, water vapor, atmospheric gases can result in severe link quality degradation. All these phenomena make wireless communications unviable without a proper precoder. Furthermore, when the wireless transmission is for multiple receivers or users, e.g., wireless communications mobile networks, a proper precoding technique can reduce both the undesired channel effects and the inter-user interference. The result of this crucial signal processing is that the transmitter with a suitable precoding technique can transmit multiple data streams to multiple users simultaneously, in such a manner that each transmitted data stream is only received by its target user and the undesired channel side effects on the received signal are negligible.

Conventional precoding techniques for low dimensional MIMO are fully digital, which means that their processing is completely realized in the digital domain by adjusting both the magnitude and phase of the baseband signals. However, these conventional fully digital techniques require an expensive and energy-intensive RF chain per antenna. Hybrid precoders have been considered a promising technique to face this problem, reducing the number of RF chains. The core of this technique relies on focusing part of the signal processing in the analog domain, such that some of the expensive and hungry-power RF chains are replaced by low-cost and high-energy-efficient analog components.

In these hybrid precoding techniques, the signal processing of the precoding procedure is divided between the analog and digital domains. In the analog domain, an analog processing procedure is performed through the analog components that mainly allow modifying the phases of the passband signals or analog signals; this procedure is also known as analog beamformer or analog precoder. On the other hand, in the digital domain, the digital signal processing modifies both the amplitude and phase of the baseband signals, this procedure is known as digital beamformer or baseband beamformer. Due to the reduction of the number of RF chains, the freedom degrees of the signal processing are reduced as well. Therefore, the expected performance of hybrid precoding techniques is inferior when compared to such expected from impractical fully digital precoding techniques. However, there is a great motivation of exploring massive MIMO with less RF chains, such that academies and industry have focused on hybrid precoding alternatives for the last years. Therefore, many hybrid precoder designs have been proposed with multiple approaches.

The hardware architecture of most existing hybrid precoding techniques uses an excessive number of high-resolution analog phase shifters (PSs). This approach is very useful to get high performance, however, the acquired power consumption and manufacturing cost are still high. Therefore, more energy-efficient hardware architectures for hybrid precoding are required, and novel signal processing techniques that exploit such architectures are indispensable.

Sajadieh, Masoud, et al. "Hybrid digital and analog beamforming for large antenna arrays." U.S. Pat. No. 9,647,735, 9 May 2017. This reference describes a hardware architecture for hybrid beamforming. The authors consider an architecture based on phase shifters (PSs), and the connections of the antenna subarrays are fixed. In addition, this invention is limited to single-user MIMO (SU-MIMO) systems.

Capar, Cagatay, et al. "Systems and methods for beam selection for hybrid beamforming." U.S. Pat. No. 10,014,918. 3 Jul. 2018. This document proposes a beamforming selection method. This type of signal processing is considered fixed or non-adaptative because it works with a pre-stored set of beams. Then, the beamforming selection procedure is executed periodically, searching for the best beam among the pre-established beams. In contrast, the present invention considers adaptative signal processing techniques, so no beam selection procedures are required.

Jeehwan, N. O. H., Taeyoung Kim, and Chungyong Lee. "Hybrid zero-forcing beamforming method and apparatus." U.S. Pat. No. 9,712,296. 18 Jul. 2017. This patent discloses a hardware architecture for hybrid beamforming based on PSs, and no switches are used. Furthermore, the authors consider the construction of the array of antennas as a single array, where the antennas' connections are fixed.

Y. Lu, C. Cheng, J. Yang, and G. Gui, "Improved hybrid precoding scheme for mmWave large-scale MIMO systems", IEEE Access, vol. 7, pp. 12027-12034, 2019. This paper describes a hybrid precoder architecture, where switches and inverters (SI) are used rather than PSs. The authors consider a hybrid precoder with a fixed and partially connected architecture, where each RF chain is connected to a fixed subarray of antennas, and the whole array of antennas is composed of several antennas subarrays.

J. Jiang, Y. Yuan, and L. Zhen, "Multi-user hybrid precoding for dynamic subarrays in mmWave massive MIMO systems", IEEE Access, vol 7, pp. 101718-101728, 2019. It proposes a dynamic architecture for hybrid processing. This document considers that each antenna has a PS and is switchable among the RF chains, which is not adequate when the number of antennas is large. Furthermore, the authors propose an inefficient algorithm to set the value or position of the switches. They select a group of possible combinations of the switches' values to test brute force. However, the selection of this group is very questionable.

However, the prior art does not comprise a practical solution for implementing massive MIMO in wireless communications devices because these solutions do not effectively reduce the manufacturing cost and the power consumption, and the obtained performance is deficient. Therefore, it is necessary (i) to explore novel hardware architectures for massive MIMO that consider chipper and higher energy-efficient analog components; and (ii) to propose signal processing techniques that exploit such hardware architectures and make the communication reliable.

SUMMARY OF THE INVENTION

The present invention aims at solving the aforementioned limitations and difficulties related to the implementation of massive MIMO in wireless devices by proposing a novel hybrid precoding technique.

The present invention proposes an apparatus and method for performing multiple-user, multiple-input, multiple-output (MU-MIMO) communication, comprising a hybrid precoder for channel precoding signals to be transmitted to a plurality of users through user channels. The hybrid precoder comprises a digital precoder configured to process the signals digitally by a digital beamformer matrix; a plurality of radiofrequency chains, and an analog precoder configured to process the signals analogically, wherein the analog precoder comprises a plurality of antennas for transmitting the signals processed by the hybrid precoder, the plurality of antennas being grouped, thereby allowing for the building of the antennas' array as an array of several subarrays of antennas; wherein in the antennas' subarray, each antenna is connected to a two-way switch, whose terminals are connected to a phase inverter and a multiple-way switch and the other terminal of the phase inverter is connected to the multiple-way switch; and the number of terminals of the multiple-way switch is equal to the number of RF chains, so that each terminal is connected to an RF chain and each antenna subarray is switchable among the RF chains.

In addition, the present invention refers to a method for performing MU-MIMO communication that comprises: processing signals digitally with a digital precoder; processing the digitally processed signals with a plurality of radiofrequency chains; processing the signals analogically with an analog precoder. The analog precoder comprises: a plurality of antennas for transmitting the signals processed by the hybrid precoder, the plurality of antennas being grouped, thereby allowing for the building of the antennas' array as an array of several subarrays of antennas; wherein in the antennas' subarray, each antenna is connected to a two-way switch, whose terminals are connected to a phase inverter and a multiple-way switch and the other terminal of the phase inverter is connected to the multiple-way switch; and the number of terminals of the multiple-way switch is equal to the number of RF chains, so that each terminal is connected to an RF chain and each antenna subarray is switchable among the RF chains.

The present invention is also related to a system and the non-transitory computer-readable storage medium adapted for performing said proposed method for MU-MIMO communication.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures help to explain the present invention.

DETAILED DESCRIPTION OF THE INVENTION

Figure 1:
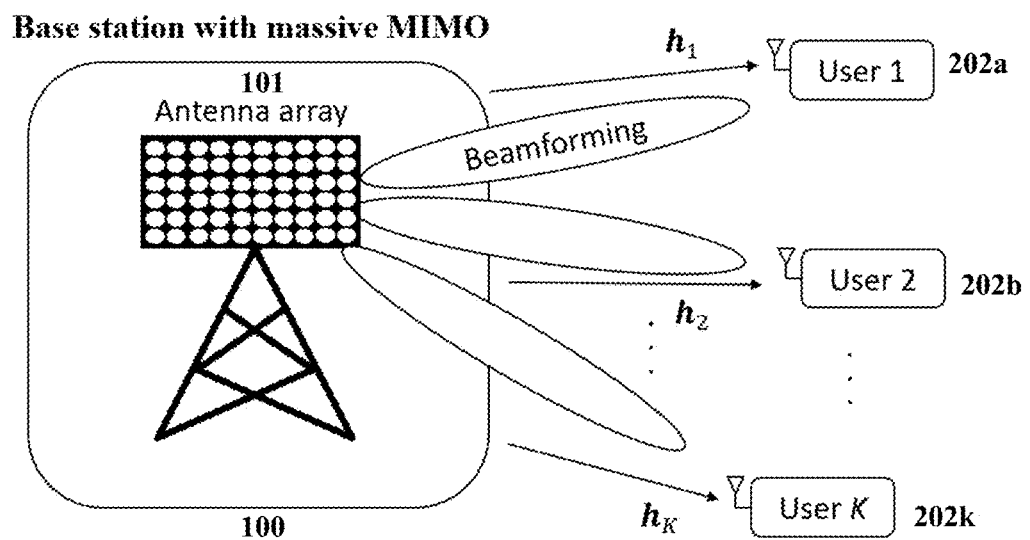
FIG. 1 illustrates the considered system model, where the base station is equipped with a massive MIMO and is transmitting to multiple single-antenna users simultaneously, according to an embodiment of the present invention.

The present invention refers to a precoding procedure and hardware architecture for transmitters in massive MU-MIMO wireless systems. The main aspect of the proposed method relies on the high energy-efficient transmission obtained through hardware components with low power consumption and low manufacturing cost. Numerical results in terms of energy efficiency evidence that our proposal reaches a gain of about 900% when compared with fully digital precoding techniques in some simulated scenarios.

The present invention proposes an apparatus and method for performing MU-MIMO communication, comprising a novel hardware architecture and the signal processing required to exploit thereof. The hybrid precoder comprises a digital precoder configured to process the baseband signals by computing a digital beamformer matrix, a plurality of RF chains configured to process the baseband and passband signals, and an analog precoder configured to process the analog signals or passband signals by computing an analog beamformer matrix.

The core of the proposed apparatus relies on the hardware architecture for the analog processing of the hybrid precoder. The transmitting antennas are grouped, thereby allowing for the building of the antennas array as an array of several antennas' subarrays rather than a single antennas' array. In the antennas' subarray, each antenna is connected to a two-way switch, whose terminals are connected to a phase inverter and a multiple-way switch. The other terminal of the phase inverter is connected to the multiple-way switch, whose number of terminals is equal to the number of RF chains, so that each terminal is connected to an RF chain thereby allowing that each antennas subarray is switchable among the RF chains.

It must be noted that in the proposed hybrid precoder architecture, some RF chains were replaced by analog components, which reduces the power consumption and manufacturing cost of the wireless devices, and to reduce them even more, the proposed hybrid precoding architecture uses switches and inverters (SI) instead of phase shifters (PS). This hardware change limits the freedom degrees of the signal processing, resulting in a loss of performance. To improve the performance of this SI-based architecture, our proposal considers some additional switches that allow selecting the appropriate RF chain for each subarray of antennas. The additional energy-efficient switches lead to a significant performance improvement at the cost of a slight computational complexity increment, so that the performance loss from hardware constraints (i.e., SI instead of PS) is greatly reduced. Thus, a dynamic hybrid precoding apparatus based on SI is proposed.

Since the proposed hybrid precoder architecture is based on switches, a proper switching method is crucial to reach optimum performance. Therefore, the key piece of the present invention relies on the proposed method that comprises an optimization algorithm for the switching procedure, which increases the system's throughput by optimizing both the inverters' selection per antenna and the antennas' subarray assignment per RF chain. Exhaustive numerical results, presented along with this disclosure, evidence that the proposed apparatus and method not only reach higher sum-rate values but is also more energy-efficient than other considered hybrid precoders. Comparing the proposed SI-based-dynamic hybrid precoder to its predecessor SI-based hybrid precoder, it is observed the dynamic subarray assignment added by our proposal gives an energy efficiency gain of about 67%.

Embodiments of the present invention are described in detail. The proposed and existing precoding adaptive techniques are all performed with the help of downlink channel state information (CSI). The assumption that full CSI is available at the transmission side is valid in time-division duplex (TDD) systems because the uplink and downlink share the same frequency band. For frequency-division duplex (FDD) systems, however, the CSI needs to be estimated at the receiver and fed back to the transmitter. The present invention considers that the knowledge of the channel side information has been reached by one of the many channel estimation methods proposed in the literature, e.g., making use of periodical transmissions of pilot symbols or reference signals, as it will be clear for a person skilled in the art. Once the base station knows the user channels, the proposed hybrid precoder is performed. The main advantage of the present invention relies on the capacity for transmitting with high energy efficiency at the cost of slight computation complexity. Furthermore, since the present invention decreases the hardware requirements for signal processing, the manufacturing cost for its practical implementation is reduced as well.

System Model

FIG. 1 presents the considered downlink MU-MIMO systems model. There are K single-antenna users 202a-202k connected to the base station 100. The base station 100 has an array of $N_t$ antennas 101, which sends K data streams simultaneously using $N_{RF}$ RF chains, where $N_{RF}$ satisfies $K \geq N_{RF} \geq N_r$. Observe that in the base station 100, the number of RF chains is less than the number of antennas in the antennas array 101, therefore, the base station 100 performs a hybrid precoder. In addition, it can be observed that the base station 100 produces multiple beamforming. Note that each beamforming is addressed to the user placement, which infers that spatial division multiple access (SDMA) is applied by the present invention. In addition, the single-antenna users 202a-202k are merely illustrative, because they can also represent a particular area, where multiple users or devices can be served by convening other access techniques, e.g., orthogonal frequency division multiple access (OFDMA), time division multiple access (TDMA), etc. However, for the sake of simplicity, the present invention will consider the single-antenna users as they are throughout this document. Furthermore, a skilled person will understand that although the description of the proposed disclosure is focused on the base station, its application can be extended to any wireless communication device, e.g., considering a scenario with one user, the transmission can be done from the terminal side.

Previous Hybrid Precoding Architectures

In order to highlight the advantages and functioning of the present invention, firstly the previous related techniques will be discussed.

Figure 2:
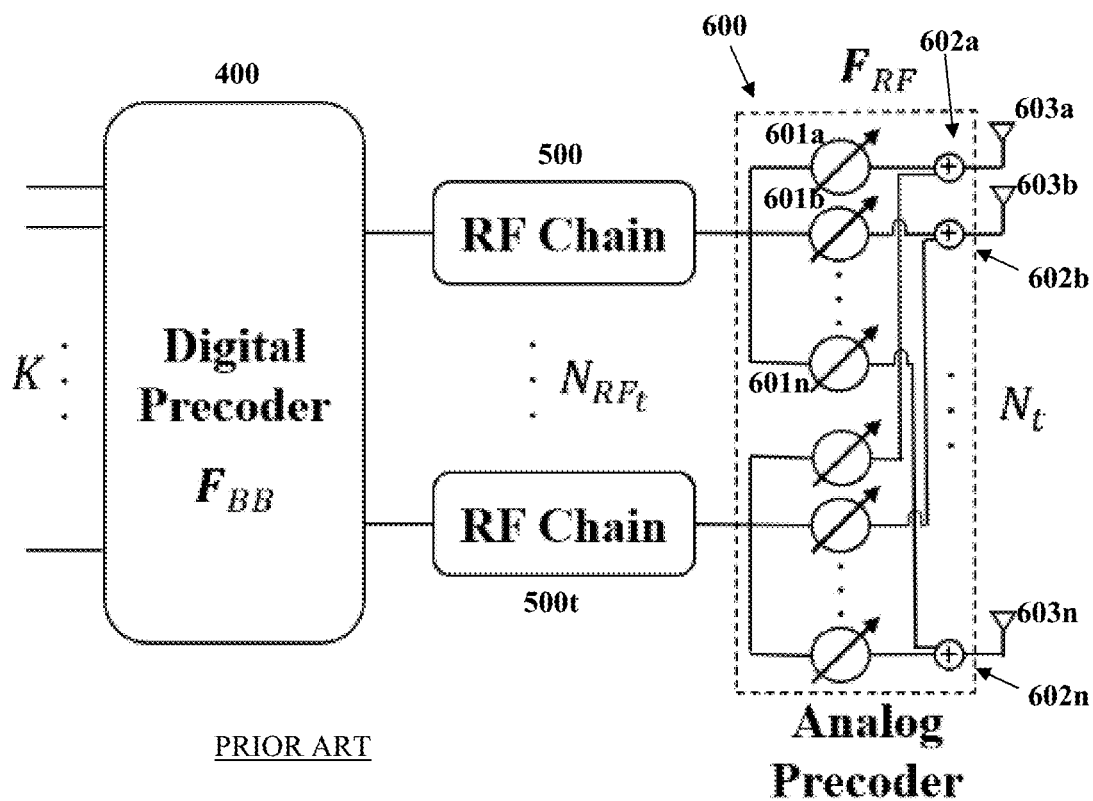
FIG. 2 presents a hybrid precoder with conventional fully connected architecture using PSs, according to an embodiment of the present invention.

A hybrid precoder using a traditional fully connected architecture based on PSs is illustrated in FIG. 2. As it can be seen, the system comprises a digital precoder 400, a plurality of RF chains 500-500t, and an analog precoder 600. The digital precoder 400 represents the digital part of the hybrid precoder or baseband beamformer, i.e., it represents the algorithm to be run in the baseband processing, which modifies the amplitude and phase of the signals. On the other hand, note that architecture of the analog part 600 of the hybrid precoder, which is represented by matrix $F_{RF} \in \mathbb{C}^{N_t \times N_{RF_t}}$ is fully connected so that the matrix $F_{RF}$ is also full. Each RF chain 500-500t is connected to all antennas 603a-603n using PSs 601a-601n and signal adders 602a-602n, so that $N_t N_{RF}$ PSs and $N_t$ signal adders are required. To decrease these hardware requirements, partially connected architecture has drawn tremendous attention because it greatly reduces the number of PSs and eliminates the need for signal adders. For partially connected architectures some entries of $F_{RF}$ are zero, for example, if the (i,j)-th entry of $F_{RF}$ is zero, $(F_{RF})_{i,j}=0$, means that the i-th antenna element has no connection with the j-th RF chain. Hybrid precoder using partially connected architectures with PSs is represented in FIG. 3, where without loss of generality $M=N_t/N_{RF}$ is an integer.

Figure 3:
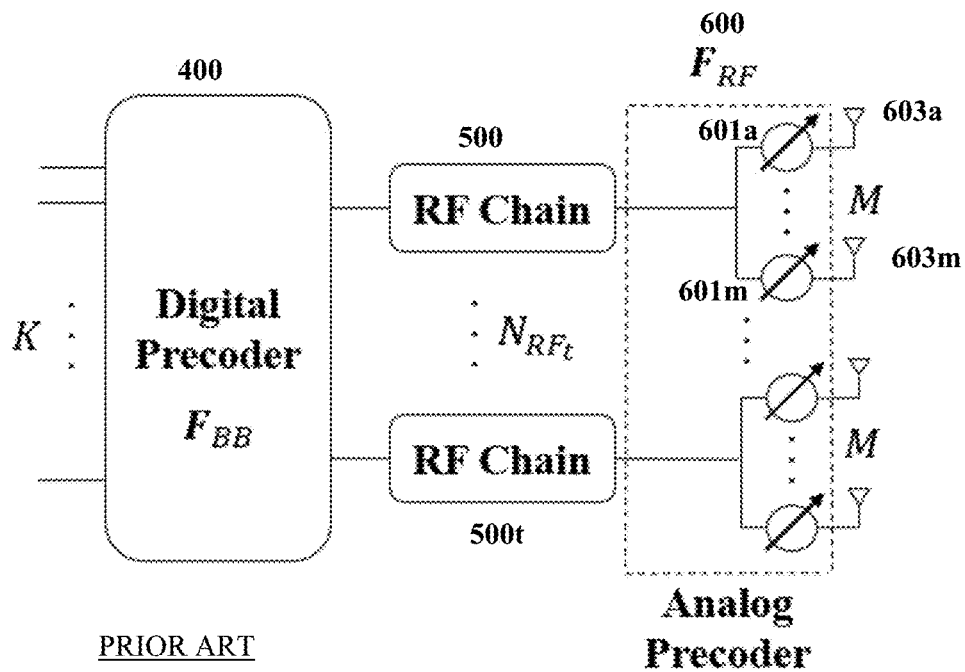
FIG. 3 presents a hybrid precoder with fixed partially connected architecture using PSs, according to an embodiment of the present invention.

FIG. 3 shows a hybrid precoder using partially connected architectures with PSs 601a-601m, where without loss of generality $M=N_t/N_{RF}$ is an integer. In this architecture, the antennas 603a-603n are not connected to all RF chains, because the disposition of the PSs 601a-601m, each group of antennas 603a-603m is connected to a single RF Chain 500-500t. For partially connected hybrid precoder as represented in FIG. 3, the analog beamformer matrix, $F_{RF}$, is a block diagonal matrix as follows $$F_{RF} = \begin{bmatrix} f_1 & 0 & \cdots & 0 \\ 0 & f_2 & \cdots & 0 \\ \vdots & \vdots & \ddots & \vdots \\ 0 & 0 & \cdots & f_{N_{RF}} \end{bmatrix} \quad (1)$$

where $f_n \in \mathbb{C}^{M \times 1}$ denotes the analog precoding complex vector of the n-th antenna subarray with size M×1.

Figure 4:
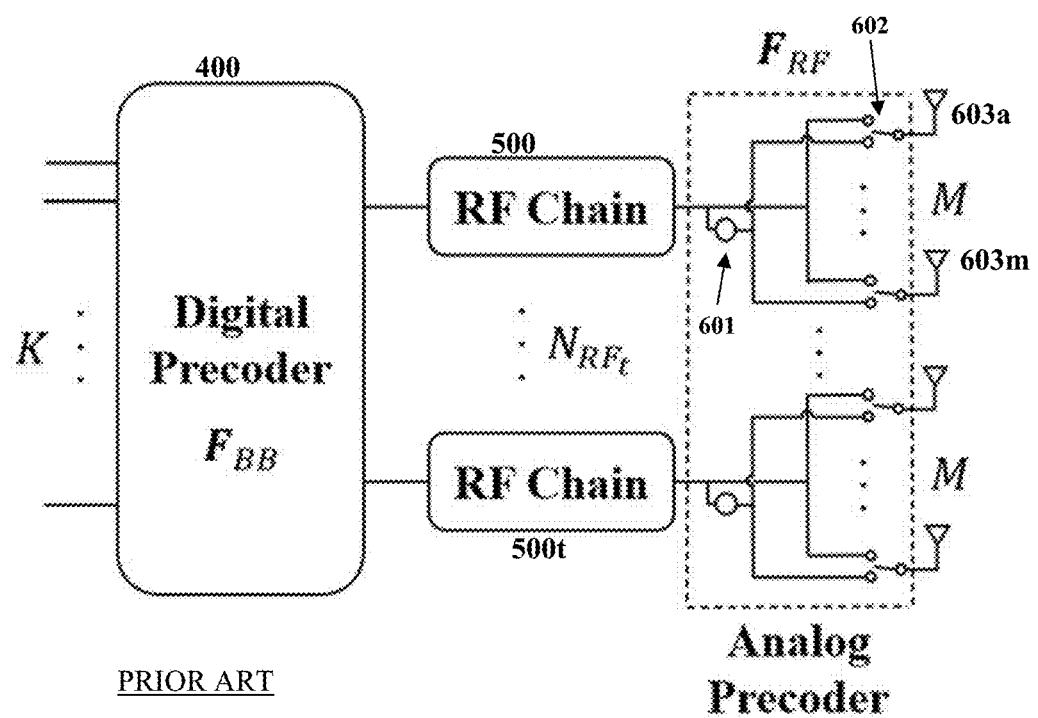
FIG. 4 presents a hybrid precoder with fixed partially connected architecture using SI, according to an embodiment of the present invention.

Conventional hybrid precoders with architectures based on PSs use high-resolution PS, which are expensive and energy intensive. Therefore, to reduce even more the energy consumption and the manufacturing cost of the wireless communications devices, the resolution of the PSs has been decreased until reach a binary decision, which allows to substitute the PSs by SI. FIG. 4 illustrates a hybrid precoder architecture based on SI, which uses $N_t$ low-energy consumption switches and $N_{RF}$ low-energy intensive inverters instead of $N_t N_{RF}$ hungry power analog PSs. For this architecture, the entries of the vector $f_n$, $n=1, \ldots, N_{RF}$ in (1) are in the set $\mathcal{F} = \{-1,1\}$ so that $f_n \in \mathcal{F}^{M \times 1}$. Note that the entries of the vector $f_n$ for the hybrid precoder represented in FIG. 3 belong to the set of the complex numbers C, i.e., $f_n \in \mathbb{C}^{M \times 1}$, which means that there are many options available to modify the passband or analog signals. In contrast, for the hybrid precoder represented in FIG. 4, the set of options is limited to two possible values −1 and 1, which represent invert the signal or not, respectively, and therefore $f_n \in \mathcal{F}^{M \times 1}$.

Proposed Hybrid Precoding Apparatus

Figure 5:
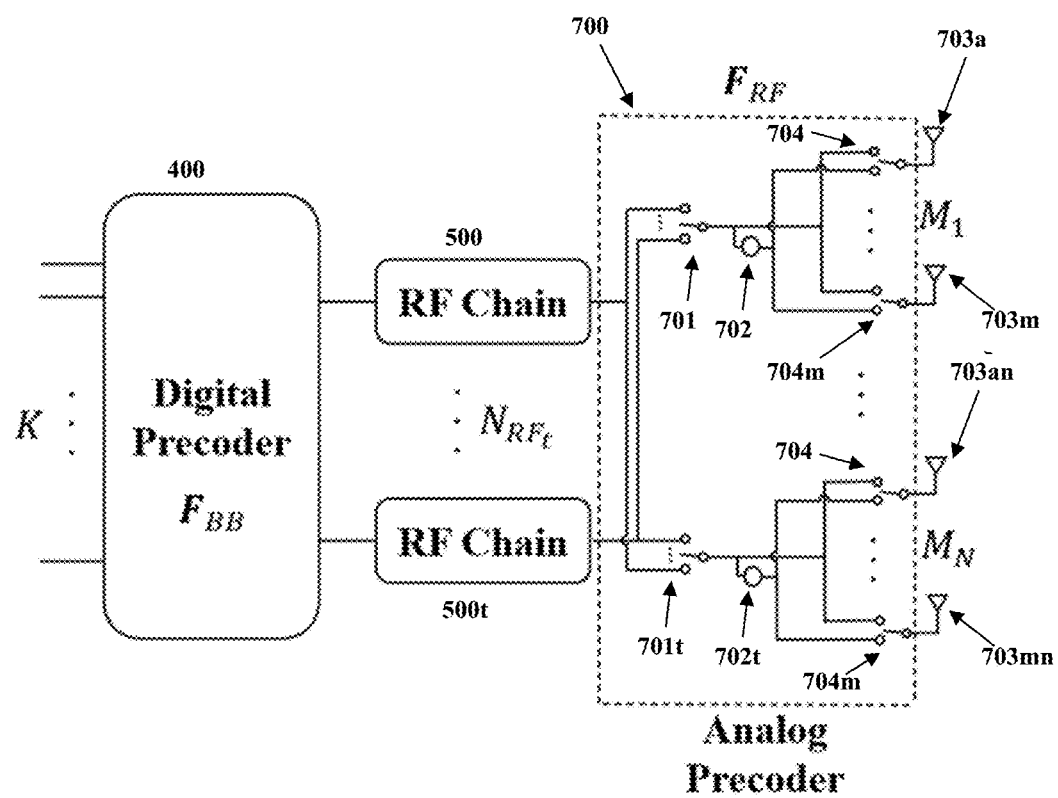
FIG. 5 illustrates the proposed apparatus for the proposed hybrid precoding. The represented hybrid precoder uses the proposed dynamic partially connected architecture based on SI. Note that there are two types of switches, two-way and multiple-way switches, according to an embodiment of the present invention.

With the purpose of solving problems of the state of the art, the present invention proposes the hybrid precoder architecture illustrated in FIG. 5. The illustrated apparatus for performing MU-MIMO communication comprises a plurality of antennas 703a-703n for transmitting the signals processed by the hybrid precoder. As seen in other techniques, the proposed hybrid precoder comprises a digital precoder 400 to process the signal digitally, a plurality of RF chains 500-500t, and an analog precoder 700 for making the required analog signal processing. However, the hardware architecture for the analog precoder is where the present invention stands out. The analog precoder 700 comprises a plurality of antennas 703a-703n, which is grouped, thereby allowing for the building of the antennas' array as an array of multiple subarrays of antennas rather than a single array of antennas. In the antennas' subarray, each antenna is connected to a two-way switch 704, whose terminals are connected to a phase inverter 702 and a multiple-way switch 701. The other terminal of the phase inverter is connected to the multiple-way switch, and the number of terminals of the multiple-way switch 701 is equal to the number of RF chains 500-500t, so that each terminal is connected to an RF chain thereby allowing that each subarray of antennas is switchable among the RF chains Power Consumption of the Considered Hybrid Precoding Architectures The advantages of the proposed architecture will be discussed with basis on the energy efficiency.

TABLE 1

Power consumption of the main elements for precoding.

| Description | Notation | Considered value |
|---|---|---|
| Digital baseband precoder | $P_{BB}$ | $P_{BB}$ = 200 mW |
| RF chain | $P_{RF}$ | $P_{RF}$ = 300 mW |
| Finite-resolution PS (4 bits) | $P_{PS}$ | $P_{PS}$ = 40 mW |
| Signal adder | $P_A$ | $P_A$ = 5 mW |
| Inverter | $P_{IN}$ | $P_{IN}$ = 5 mW |
| Switch | $P_{SW}$ | $P_{SW}$ = 5 mW |

Considering the power consumption of the elements described in Table 1, whose values have been validated by previous works (see for example document Y. Lu, C. Cheng, J. Yang, and G. Gui, "Improved hybrid precoding scheme for mmWave large-scale MIMO systems", IEEE Access, vol. 7, pp. 12027-12034, 2019), the total power consumption of the hybrid precoders explained above can be computed as follows:

Fully digital precoder $$P_{FD} = E_T + P_{BB} + N_t P_{RF} \quad (2)$$

Hybrid precoder with fully connected architecture using PSs $$P_{F-PS} = E_T + P_{BB} + N_{RF} P_{RF} + N_{RF} N_t P_{PS} + N_t P_A \quad (3)$$

Hybrid precoder with fixed partially connected architecture using PSs $$P_{FP-PS} = E_T + P_{BB} + N_{RF}P_{RF} + N_t P_{PS} \quad (4)$$

Hybrid precoder with fixed partially connected architecture using SI $$P_{FP-SI} = E_T + P_{BB} + N_{RF}P_{RF} + N_{RF}P_{IN} + N_t P_{SW} \quad (5)$$

Proposal: hybrid precoder with dynamic partially connected architecture using SI $$P_{DP-SI} = E_T + P_{BB} + N_{RF}P_{RF} + NP_{IN} + (N_t + N)P_{SW} \quad (6)$$

Downlink Transmission

Figure 6:
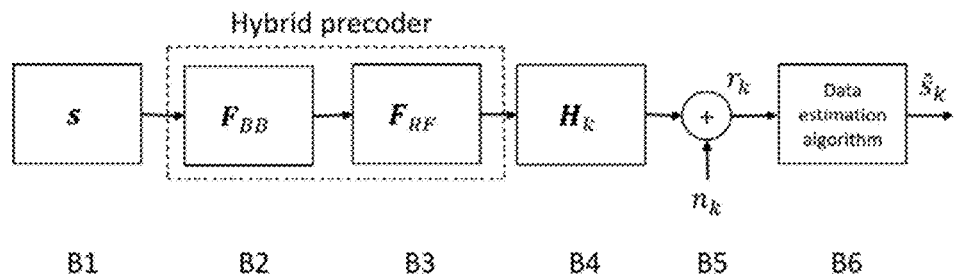
FIG. 6 shows a block diagram of the downlink transmission for the user k when the proposed hybrid precoder is used in the base station or transmitter, according to an embodiment of the present invention.

FIG. 6 presents a diagram block of the downlink transmission for the user k using hybrid processing in the base station or transmitter. Block B1 represents the information to be transmitted to all users. The data stream vector s is a concatenation of the users' streams such that $s=[s_1, s_1, \ldots, s_K]^T$, where $s_k \in \mathbb{C}$ represents the data stream symbol of the user k and belongs to a symbols' constellation, e.g., QPSK, 16-QAM, etc.

Blocks B2 and B3 aim to mitigate the undesired effects of the channel and to separate accurately the data stream among the users by reducing the inter-user interference. These two blocks together form the hybrid precoder shown in FIG. 5, where Block B2 refers to the digital precoder 400 and block B3 refers to the analog precoder 700.

Block B2 performs the digital beamforming of the hybrid precoder or baseband beamformer, i.e., the algorithm to be run in the baseband processing, therefore, changes in amplitude and phase of the signals are available. These changes, specified by the matrix $F_{BB}$, will be executed by an integrated circuit capable of manipulating signals, such as an FPGA as will be considered in the following description. The entries values of the matrix $F_{BB}$ tells the FPGA how much it must change the signal in both phase and amplitude. Observe that the FPGA must just manipulate $N_{RF}$ signals rather than $N_t$, and in the present invention, the value of $N_{RF}$ is reduced to the number of users K such that $N_{RF}=K$.

Once the signals have been modified by the digital precoder 400, they pass through the RF chains 500-500t as specified in FIG. 5. In this process, several signal modifications are done, e.g., to transform the digital signals into analog signals, to amplify the signal power, etc. After that, another precoding process is performed, but this time only analog changes are available because it is a passband processing or analog processing. These phase changes are performed typically by PSs; however, the proposed architecture uses low cost and energy-efficient SI rather than PSs as illustrated in FIG. 5. It should be noted that the antennas' subarrays are switchable among the RF chains using multi-way switches. Furthermore, there is a two-way switch per antenna, which offers just two options for the phase change: invert the signal or not. The analog beamformer or analog part of the hybrid precoder represented as $F_{RF}$, or by Block B3 in FIG. 6, tells the switches how much they must be positioned to obtain an optimal performance.

Once the signals have been modified by the analog precoder part, the signals are propagated using a large number of antennas (see FIG. 5). These propagated signals are attenuated by different multi-paths from the base station to the user k, and such attenuations are represented as the channel matrix $h_k$ (this matrix in the literature is also known as channel gain matrix) or by Block B4 in FIG. 6. Due to the circuit imperfections in the receiver an additive white Gaussian noise, $n_k$, is added, such that the received signal by the user k, $r_k \in \mathbb{C}$, is expressed as $$r_k = h_k F_{RF} F_{BB} s + n_k \quad (7)$$

Denoting $f_k$ as the hybrid precoder part related to the user k, which corresponds to the k-th row of the product $F_{RF}F_{BB}$, equation (7) can be rewritten as $$r_k = h_k f_k s_k + \sum_{j \neq k} h_k f_j s_j + n_k \quad (8)$$

Equation (8) is composed by three terms, the signal desired by user k, the inter-user interference, and the noise. The analog beamformer $F_{RF}$ and digital beamformer $F_{BB}$ proposed by the present invention produces that received signal the user k can be reduced and written as $$r_k = \gamma_k s_k + n_k \quad (9)$$

Observe that the present invention eliminates the inter-user interference and mitigates the undesired effects of the channel. Note that only the variable $\gamma_k$ is affecting the desired data signal $s_k$. Therefore, the receiver can perform a very simple algorithm to estimate $s_k$, e.g., the receiver can estimate $\gamma_k$ by reference signals and then performs a data estimation algorithm; or instead of estimating $\gamma_k$, the receiver can have a set of the most probable values of $\gamma_k$ according to its signal-to-noise ratio (SNR) and then run a data estimation algorithm, or just run directly an algorithm for data detection. This data estimation algorithm is represented by Block B6 in FIG. 6. There are many algorithm options for data detection, one of the most popular is by minimum distance detection, which rounds $r_k$ to its closest symbol representation from the used constellation, e.g., QPSK, 64QAM, etc.

Proposed Hybrid Precoding Method

As seen above, in view of the functions and steps of operations of necessary for establishing communication, the present invention also refers to a method for performing multiple user multiple input multiple output (MU-MIMO) communication, comprising:

processing signals digitally with a digital precoder;
processing the digitally processed signals with a plurality of radiofrequency chains;
processing the signals analogically with an analog precoder (700), wherein the analog precoder (700) comprises:
a plurality of antennas for transmitting the signals processed by the hybrid precoder, the plurality of antennas being grouped, thereby allowing for the building of the antennas' array as an array of several subarrays of antennas; wherein in the antennas' subarray, each antenna is connected to a two-way switch, whose terminals are connected to a phase inverter and a multiple-way switch and the other terminal of the phase inverter is connected to the multiple-way switch; and the number of terminals of the multiple-way switch is equal to the number of RF chains, so that each terminal is connected to an RF chain and each antenna subarray is switchable among the RF chains.

Thus, having generally described the proposed architecture and method with basis on the exemplificative diagram of the downlink transmission, the optimal signal processing for the proposed hybrid precoder architecture will be described.

The proposed method aims to maximize the achievable sum-rate by setting the appropriated positions of the switches' terminals in the proposed hybrid precoding architecture. For the digital part of the hybrid precoder 400, $F_{BB}$, we recommend using the classic Zero Forcing (ZF) precoder, however, another linear precoder can be used, but the designer should be aware of the consequences of such selection, due to it changes (9) and, therefore, the data estimation procedure in the receiver must be adapted to such changes. Continuing with the explanation of our proposal, the ZF precoder can be formally computed as $$F_{BB} = c_n (HF_{RF})^\dagger \quad (10)$$

where $H=[h_1^T \ldots h_K^T]^T$ and $c_n$ is computed to satisfy the power constraint such that $\|F\|_F^2 = \|F_{RF} F_{BB}\|_F^2 = E_T$, where $E_T$ represents the total available power for transmission.

In the proposed hybrid precoding architecture illustrated in FIG. 5, there are N switches with $N_{RF}$ possible values and $N_t$ switches with two possible values, such that the total number of switching combinations is $N_{RF}^N + 2^{N_t}$. Let us $f_i$ denotes the switch value related to the i-th antenna, such that $f_i \in \mathcal{F}$, where $\mathcal{F} = \{-1, 1\}$, $i = 1, \ldots, N_t$, and $g_j$ represents the switch value of the j-th antenna subarray, where $g_j \in \mathcal{G}$, with $\mathcal{G} = \{1, 2, \ldots, N_{RF}\}$. Therefore, if the i-th antenna is in the j-th antenna subarray, then its entry value can be assigned in analog beamforming matrix as $$(F_{RF})_{i,g_j} = f_i \quad (11)$$

Thus, the proposed optimization problem can be defined as $$F_{RF}^* = \underset{f \in \mathcal{F}^{N_t \times 1}, g \in \mathcal{G}^{N \times 1}}{\operatorname{argmax} R} \quad (12)$$

where $f = [f_1, f_2, \ldots, f_{Nt}]^T$, $g = [g_1, g_2, \ldots, g_N]^T$, and R represents the sum-rate of the system. The steps of the proposed solution for this problem are described below Step 1. Map the decimal value of $g_j \in \mathcal{G}$ to its binary representation $G_{j,:}$, such that $G_{j,:} \in \mathcal{B}^{1 \times N_b}$, where $\mathcal{B} = \{0, 1\}$ and $N_b = \log_2 N_{RF}$. Thus, the vector $g \in \mathcal{G}^{N \times 1}$ can be written as a binary matrix $G \in \mathcal{B}^{N \times N_b}$. Then, the binary matrix G is vectorized by stacking its rows as follows:

$$\bar{g} = [G_{1,:}, G_{2,:} \ldots G_{N,:}]^T \quad (13)$$

where $G_{j,:}$ denotes the j-th row of the matrix G, $j = 1, \ldots, N$.

Step 2. Consider $p_j$ as the probability of $\bar{g}_j = 1$, and $1 - p_j$ as the probability of $\bar{g}_j = 0$, where $\bar{g}_j$ is the j-th entry of the vector $\bar{g}$ and $j = 1, 2, \ldots, N N_b$. Thus, the probability of the N switches values represented by the binary vector $\bar{g}$ is given by $$p = [p_1, p_2, \ldots, p_{NN_b}]^T \quad (14)$$

Since there is no priori information, the probability is initialized to $p^{(0)} = (1/2) 1_{NN_b \times 1}$, where $1_{a \times b}$ is a ones matrix with size a×b.

Step 3. Consider $u_i$ as the probability of $f_i = 1$, and $1 - u_i$ as the probability of $f_i = -1$, so the probability of the $N_t$ non-zero elements in $F_{RF}$ is $$u = [u_1, u_2, \ldots, u_{N_t}]^T \quad (15)$$

Since there is no priori information, the probability is initialized to $u^{(0)} = (1/2) 1_{N_t \times 1}$.

Step 4. Generate S random vectors $\bar{g}^s$ and $f^s$, $s = 1, 2, \ldots, S$, according to $p^{(m)}$ and $u^{(m)}$, respectively, where m represents the m-th iteration.

Step 5. Obtain the decimal representation $g^s$ from $\bar{g}^s$ for $s = 1, 2, \ldots, S$. Then, calculate $F^s = F_{RF}^s F_{BB}^s$ using (9) and (10). After that, compute the sum-rate $R(F^s)$ by making use of $$R = \sum_{k=1}^{K} \log_2 \left( 1 + \frac{\|h_k F_{:,k}\|^2}{\sum_{j \neq k}^{K} \|h_k F_{:,j}\|^2 + \sigma_n^2} \right) \quad (16)$$

Step 6. Select the $S_{elite}$ largest sum-rate values from Step 5, $R(F^1) > R(F^2) > \ldots > R(F^{S_{elite}})$.

Step 7. Compute the weights of the $S_{elite}$ candidates $$w_s = \frac{S_{elite} |R(F^s) - R(F^{S_{elite}})|}{\sum_{s=1}^{S_{elite}} |R(F^s) - R(F^{S_{elite}})|} \quad (37)$$

Step 8. Update $p^{(m+1)}$ and $u^{(m+1)}$ $$p_j^{(m+1)} = \frac{\sum_{s=1}^{S_{elite}} w_s \bar{g}_j}{\sum_{s=1}^{S_{elite}} w_s} \quad (18)$$

$$u_i^{(m+1)} = \frac{\sum_{s=1}^{S_{elite}} w_s (f_i + 1)}{2 \sum_{s=1}^{S_{elite}} w_s} \quad (19)$$

Return to Step 4 and increase the iteration counter m=m+1 to repeat this procedure up to reach the maximum number of iterations, $N_i$. Then, $F_{RF}^*$ is taken from the best sum-rate value among all iterations.

Note that the proposed apparatus points out the hardware architecture for the analog part of the hybrid precoder, while the proposed method refers to the algorithm that should be executed for the well-performing of the proposed apparatus.

The example embodiments described herein may be implemented using hardware, software, or any combination, thereof and may be implemented in one or more computer systems or other processing systems. Additionally, one or more of the steps described in the examples embodiments herein may be implemented, at least in part, by machines. Some machines helpful in performing the operations of the example embodiments herein include, but are not limited to, specially programmed computers, desktop computers, server computers, client computers, portable computers, mobile communication devices, tablets, or similar devices.

For instance, one illustrative system for performing the operations of the embodiments herein may include one or more of the following components: microprocessors for performing the arithmetic and or logical operations required for program execution; storage media such as disk drives, memory cards, or flash memory, for program and data storage; and a random-access memory for temporary data and program instruction storage.

Therefore, the present is related to a system for performing MU-MIMO communication, characterized by comprising a processor and a memory storing the computer-readable instructions, whose execution causes the processor to perform the steps of the proposed method previously described in this disclosure.

The system may also include software resident on a storage media (e.g., a disk drive or memory card), which, when executed, directs the microprocessor(s) in performing transmission and reception functions. The software may run on an operating system stored on the storage media, such as UNIX or Windows, Linux, Android, etc. It can adhere to various protocols such as the Ethernet, ATM, TCP/IP protocols, and other connection or connectionless protocols.

As is well known in the art, microprocessors can run different operating systems and contain several types of software dedicated to specific functions, such as handling and managing data/information from a particular source or transforming data/information from one format into another. The embodiments described herein are not to be construed as being limited to the use of any particular type of computer server, but any other suitable type of device for facilitating the exchange and storage of information may be employed instead.

Software embodiments of the illustrative embodiments presented herein may be provided as a computer program product or software, whose instructions may be included in a manufactured article as machine-accessible or non-transitory computer-readable medium, a.k.a., "machine-readable medium." The instructions on the machine-accessible or machine-readable medium may be used to program a computer system or other electronic device. The machine-readable medium may include, but is not limited to, floppy diskettes, optical disks, CD-ROMs, magneto-optical disks, or another type of media/machine-readable medium suitable for storing or transmitting electronic instructions.

Therefore, the present invention also relates to a non-transitory computer readable storage medium for performing multiple user multiple input multiple output (MU-MIMO) communication, comprising computer readable instructions that, when performed by the processor, causes the processor to perform the method steps previously described in this disclosure.

The techniques described herein are not limited to any particular software configuration, but they may be applicable in any computing or processing environment. The terms "machine-accessible medium," "machine-readable medium," and "computer-readable medium" used herein shall include any non-transitory medium capable of storing, encoding, or transmitting a sequence of instructions for execution by the machine (e.g., a CPU or other processing device type) and that cause the machine to perform any one of the methods described herein. Furthermore, it is common in the art to speak of software, in one form or another (e.g., program, procedure, process, application, module, unit, logic, and so on) as triggering or causing a result. Such expressions are merely a shorthand way of stating that the software executed by a processing system causes the processor to act and produce a result.

Effect

In the simulations, the channels are generated by considering that the antennas array 101 of the base station 100 is arranged as a uniform planar array with square format. The total energy available at the base station 100, $E_T$, is equal to K. The results are averaged over $10^3$ channel realizations. For the proposed hybrid architecture illustrated in FIG. 5, the antenna subarrays have the same size, i.e., $M_1=M_2=\ldots=M_N$. The parameters of the proposed algorithm are: S=500, $S_{elite}=40$, and $N_i=60$. In addition, the SNR is given by the ratio of the total transmitting power between the power noise in the receivers.

Figure 7:
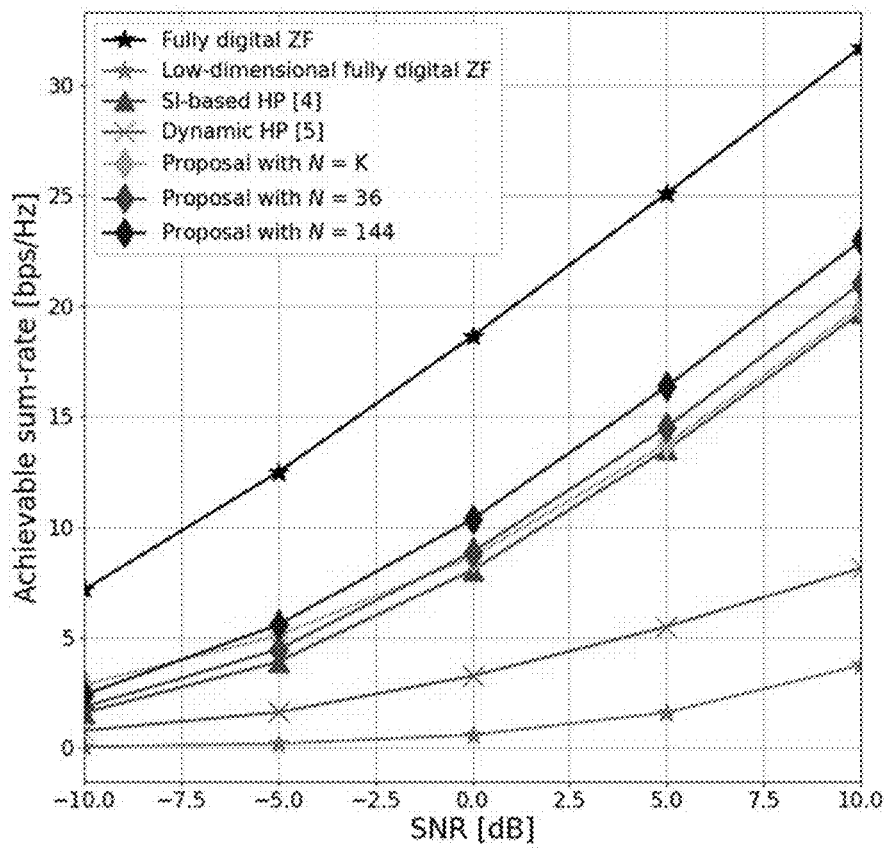
FIG. 7 shows a performance comparison between our proposal, other hybrid precoders, and a fully digital precoder in terms of sum rate, according to an embodiment of the present invention.

For comparison purposes, we consider the following published papers related to the present invention:

FIG. 7 presents the achievable sum-rate results obtained by considering a mmWave large-scale scenario where the BS is equipped with $N_t=144$ antennas and there are 4 single-antenna users.

In FIG. 7, it is noted that our proposal overcomes all the considered hybrid precoders, including its predecessor proposed in [4], which is labeled as SI-based HP [4] and uses a fixed partially connected architecture based on SI as such illustrated in FIG. 4. On the other hand, the hybrid precoder proposed in [5] and referred hereafter to Dynamic HP [5] uses a fully connected architecture, where there are a PS and a multi-way switch per antenna, such that each antenna is switchable among the RF chains. Although [5] considers a PS per antenna, which offers more freedom degrees for manipulating the analog signals than a two-way switch and inverter phase per antenna, the signal processing proposed in [5] does not exploit the hardware architecture's capacities. FIG. 7 evidences that Dynamic HP [5] does not provide even the third part of the performance reached by our proposal.

An interesting behavior of the presented invention happens when the number of subarrays increases, which requires more switches and thereby produces more switching positions, implying more freedom degrees for the analog signal manipulations. FIG. 7 shows that the proposed method can successfully explore the incremented set of switching options, outcoming better performance as the number of switches is large. Observe that a slight improvement is reached when N=4. However, if $N=N_t=144$, which means that each antenna is switchable among the $N_{RF}$ chains, our proposal achieves a significant sum-rate gain. In addition, the performance curve related to Fully digital ZF represents the performance obtained by a fully digital ZF precoder. However, such performance is reached at the cost of a prohibited hardware requirement, which considers the number of RF chains equal to the number of antennas, $N_t=N_{RF}=144$. The performance of a conventional low-dimensional MIMO precoder is represented by the curve related to Low-dimensional fully digital ZF. For this specific curve, the transmitter is equipped with $N_t=N_{RF}=4$, which illustrates what will happen if the number of antennas is equal to the number of RF chains considered by the simulated hybrid precoders. Clearly, in mmWave scenarios, the performance of low-dimensional MIMO is poor. This fact highlights the need to implement massive MIMO in mmWave scenarios to take advantage of the significant data rate that could be explore there.

Figure 8:
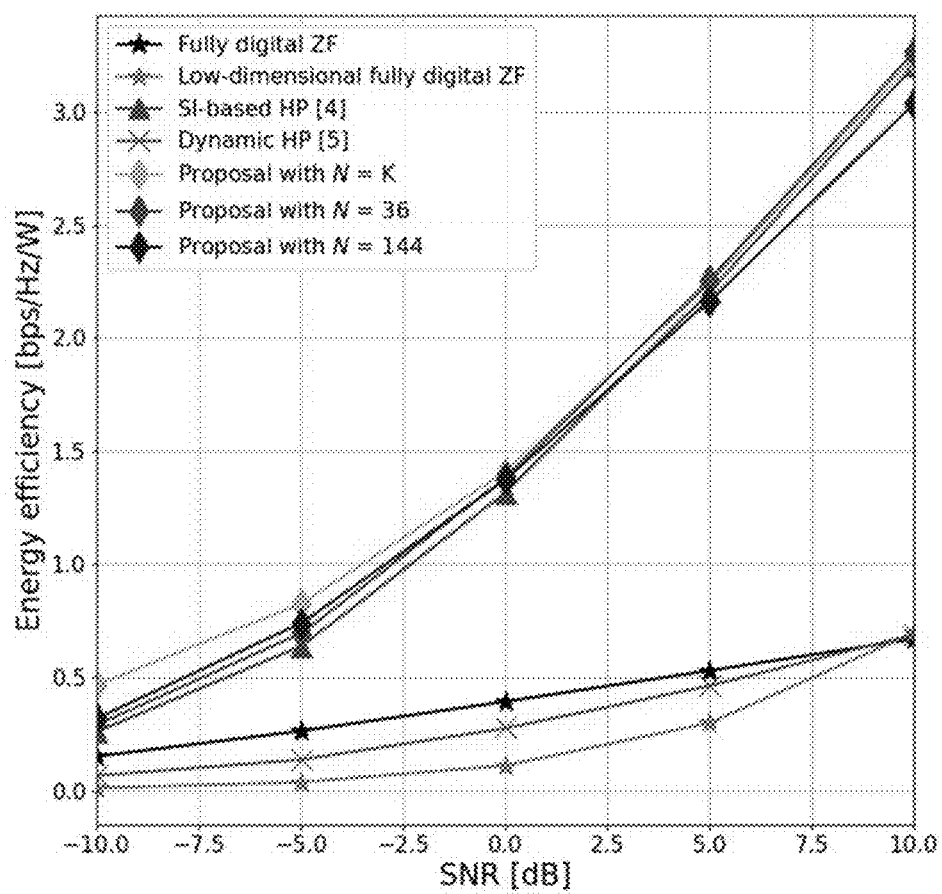
FIG. 8 shows a performance comparison between our proposal, other hybrid precoders, and a fully digital precoder in terms of energy efficiency, according to an embodiment of the present invention.

FIG. 8 compares the energy efficiency of the considered techniques and our proposal in the same scenario used in FIG. 7, i.e., the BS is equipped with $N_t=144$ antennas, and there are 4 single-antenna users.

In FIG. 8, it is noted the poor energy efficiency of the fully digital technique. In the high SNR region, the proposed hybrid precoder obtains an energy efficiency gain relative to the fully digital technique greater than 3 bps/Hz/W or 950%.

Figure 9:
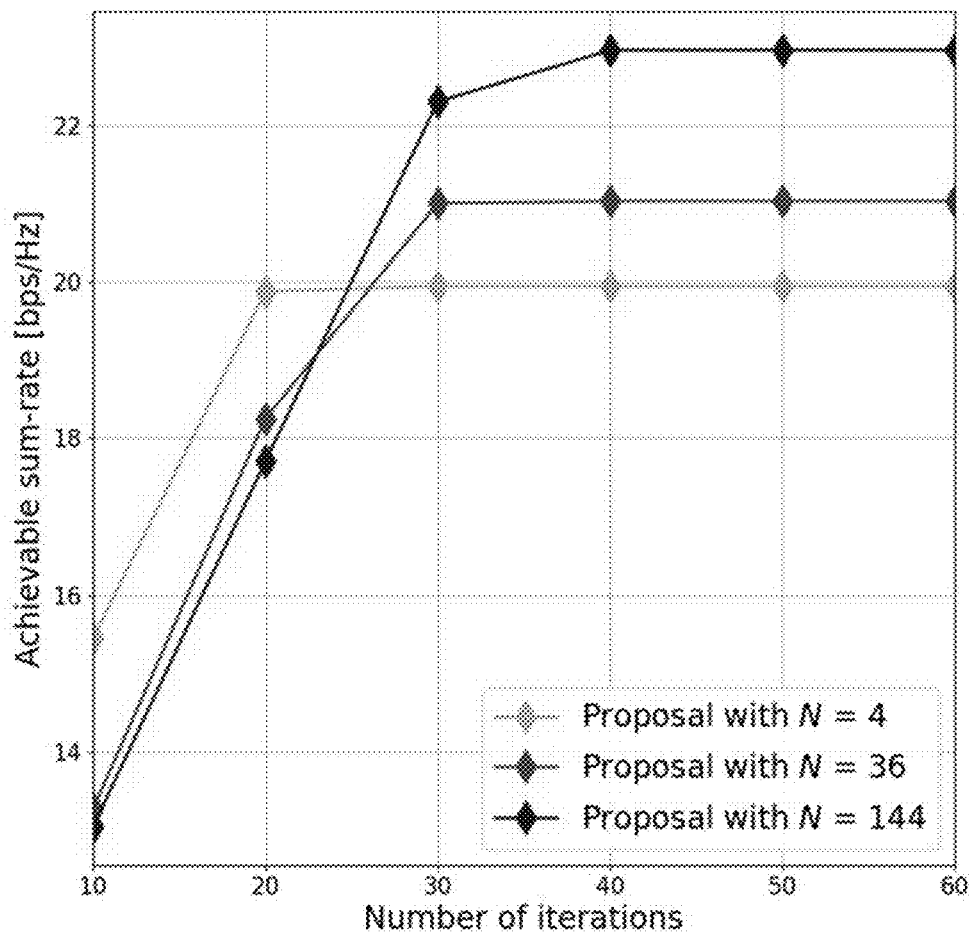
FIG. 9 shows the achievable sum-rate convergence of the proposed algorithm when different numbers of antenna subarrays are considered, according to an embodiment of the present invention.

FIG. 9 shows the achievable sum-rate convergence of the proposed algorithm throughout the number of iterations $N_i$ by testing different numbers of subarrays. The tested mmWave scenario considers a base station equipped with $N_t=144$ antennas that transmits to K=4 users simultaneously, whose SNR is fixed to 10 dB.

In FIG. 9, it is observed that the achievable sum-rate tends to be stable after 50 iterations or even faster as the number of subarrays decrease. This is an expected result because it is reasonable that the algorithm's complexity is directly related to the number of switches, so that the algorithm's complexity increases as the number of switches is larger.

Figure 10:
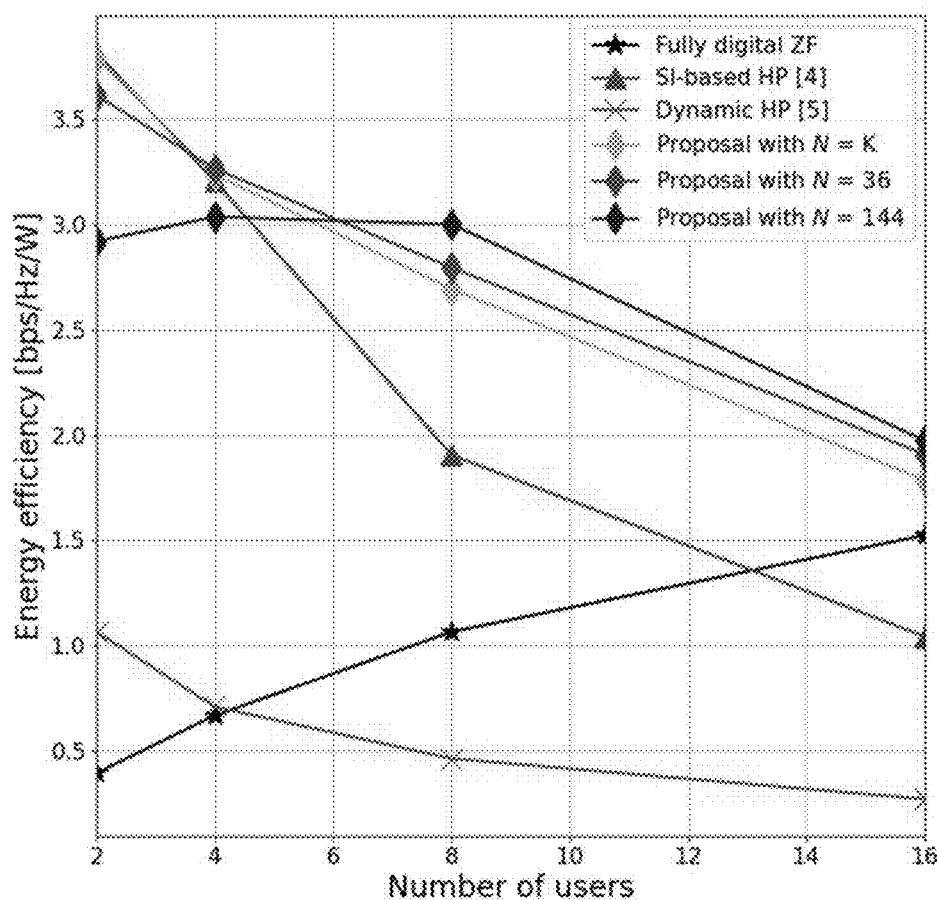
FIG. 10 shows the most important results related to the energy efficiency of the proposed hybrid precoder, according to an embodiment of the present invention.

FIG. 10 shows the energy efficiency behavior when the number of users variates. The simulated scenarios consider the following parameters as fixed $N_t=144$ and SNR=10 dB.

In FIG. 10, it is clearly observed the superior energy efficiency of the present invention. When the number of users is 4, our proposal obtains a similar performance to such reached by its predecessor, SI-based HP [4]. However, the present invention obtains a significant improvement when the number of users is greater than 4. For N=144, the obtained improvement relative to SI-based HP [4] is about 67% and tends to be maintained along the curve. Even just adding K switches, the present invention reaches an energy efficiency gain of 50%. An exciting situation comes out by comparing the energy efficiency of the present invention and Fully digital ZF. Observe that the difference of these curves can be up to 3 bps/Hz/W, which suggests that our proposal reaches an energy efficiency improvement of 950%. This fact is due to the number of antennas is much greater than the number of RF chains. However, as the number of users increases, the number of RF chains required by the present invention increases, so the curve related to the present invention and Fully digital ZF will intersect at some point. At this intersection point, the only advantage offered by the present invention relies only on the manufacturing cost and on the space reduction of the hardware requirements. However, to avoid losing the energy-efficiency gain provided by the present invention, the number of antennas should be increased when the number of users is larger. This approach does not affect the number of RF chains in our proposal, whereas for the fully digital ZF, it does affect.

Figure 11:
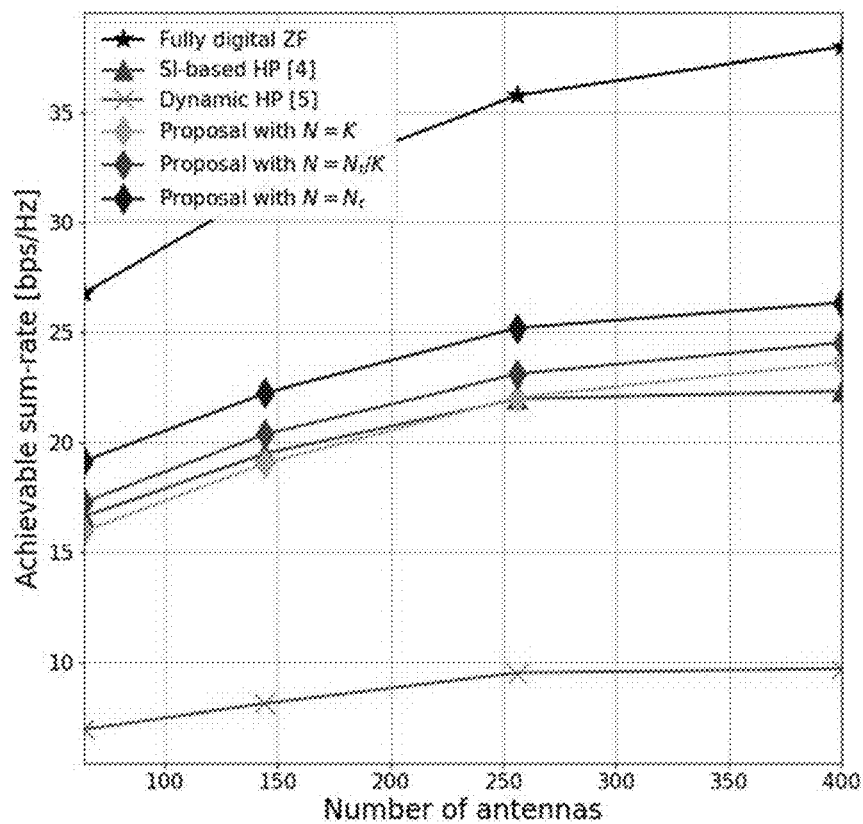
FIG. 11 shows a sum rate comparison by changing the number of antennas, according to an embodiment of the present invention.

FIG. 11 shows a sum-rate comparison by considering different numbers of antennas. The simulated scenarios assume the following parameters fixed K=4 and SNR=10 dB. In this Figure, it is observed that our proposal obtains the closest performance to Fully digital ZF. Observe that Dynamic HP [5] has poor performance because its switching algorithm does not explore the capacity of the hybrid architecture, but it assigns unproperly the switches positions. Dynamic HP [5] does not provide good performance even using high-resolution phase shifters and one switch per antenna. On the other hand, Fully digital ZF obtains a very desirable sum rate, but this technique is energy-intensive and expensive, so its energy efficiency is compromised, as observed in FIG. 12.

Figure 12:
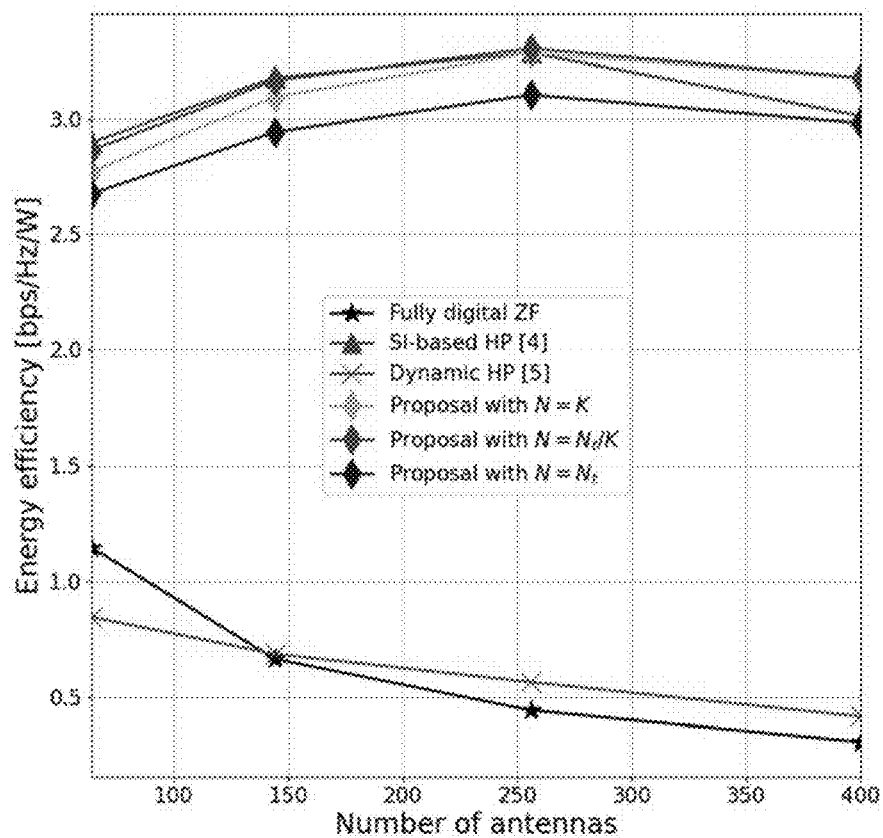
FIG. 12 shows an energy efficiency comparison by changing the number of antennas, according to an embodiment of the present invention.

FIG. 12 shows an energy efficiency comparison by considering different numbers of antennas. The simulated scenarios assume the following parameters fixed K=4 and SNR=10 dB. In this Figure, it is noted that our proposal reaches the highest energy-efficient values. Note that its predecessor, SI-based HP [4], produces a lower energy efficiency than the such obtained by our proposal when the number of antennas is larger. Furthermore, FIG. 12 highlights, one more time, the poor energy efficiency of the considered fully digital technique, i.e., Fully digital ZF.

While various example embodiments have been described above, it should be understood that they have been presented by way of example, and not limitation. It will be apparent to persons skilled in the relevant art(s) that various changes in form and detail can be made therein.

What is claimed is:

1. An apparatus performing multiple user multiple input multiple output (MU-MIMO) communication, the apparatus comprising:
   a hybrid precoder for channel precoding signals to be transmitted to a plurality of users through user channels, the hybrid precoder comprising:
     a digital precoder configured to precode the signals digitally by using a digital beamformer matrix;
     a plurality of radiofrequency (RF) chains, and
     an analog precoder configured to precode the signals analogically, the analog precoder includes a plurality of antennas to transmit the precoded signals processed by the hybrid precoder, the plurality of antennas are grouped, thereby allowing for building of antennas' array as an array of several subarrays of antennas;
   wherein in the antennas' subarray, each antenna is connected to a two-way switch, having terminals connected to a phase inverter and a multiple-way switch and another terminal of the phase inverter connected to the multiple-way switch; and
   the number of terminals of the multiple-way switch is equal to the number of the plurality of RF chains such that each terminal is connected to an RF chain and each antenna subarray is switchable among the plurality of RF chains.

2. The apparatus according to claim 1, wherein the apparatus is configured to execute a switching algorithm that sets a position of the multi-way switches and the two-way switches for increasing the sum rate, wherein the switching algorithm is based on:
   the optimal setting of the multi-way switches and the two-way switches is addressed to maximize the sum-rate of a system and is formulated by the following optimization problem:

$$F_{RF}^* = \underset{f \in \mathcal{F}^{N_t \times 1},\, g \in \mathcal{G}^{N \times 1}}{\operatorname{argmax} R}$$

where $F_{RF}^*$ is the optimum analog beamformer, $f=[f_1, f_2, \ldots, f_{Nt}]^T$ represents the values of the $N_t$ two-way switches, $g=[g_1, g_2, \ldots, g_N]^T$ represents the values of the N $N_{RF}$-way switches, and R represents the sum-rate of the system; $f_i$ denotes the switch value related to the i-th antenna, i=1, ..., $N_t$, such that $f_i \in \mathcal{F}$, where $\mathcal{F}=\{-1,1\}$ represents the invert and not-invert options of the switches, $g_j$ represents the switch value of the j-th antenna subarray, j=1, ..., N, where $g_j \in \mathcal{G}$, and $\mathcal{G}=\{1,2, \ldots, N_{RF}\}$ represents the $N_{RF}$ options of the switches; in addition, $N_t$ represents the number of antennas at the transmitter, $N_{RF}$ is the number of the plurality of RF chains, and N the number of antenna subarrays in the transmitter.

3. The apparatus according to claim 2, wherein the decimal value of $g_j$ is mapped to its corresponding binary representation such that $G_{j,:} \in \mathcal{B}^{1 \times N_b}$ where $\mathcal{B}=\{0,1\}$ and $N_b = \log_2 N_{RF}$; the vector $g \in \mathcal{G}^{N \times 1}$ is written as a binary matrix $G \in \mathcal{B}^{N \times N_b}$; then, the binary matrix G is vectorized by stacking its rows as follows:

$$\bar{g} = [G_{1,:} G_{2,:} \ldots G_{N,:}]^T$$

where $G_{j,:}$ denotes the j-th row of the binary matrix G, j=1, ..., N.

4. The apparatus according to claim 3, wherein the apparatus is further configured to compute the probability of the N phase switches values, $p=[p_1, p_2, \ldots, p_{NN_b}]^T$. For the binary vector $\bar{g}$, where $\bar{g}_j$ is the j-th entry of the vector $\bar{g}$, and j=1,2, ..., N $N_b$, the probability of $\bar{g}_j=1$, is $p_j$, and the probability of $\bar{g}_j=0$ is given by $1-p_j$; and, due to there is no priori information, the probability is initialized to $p^{(0)}=(\frac{1}{2}) 1_{NN_b \times 1}$, where $1_{a \times b}$ is a ones matrix with size a×b.

5. The apparatus according to claim 4, wherein the apparatus is further configured to compute the probability of the $N_t$ non-zero elements in $F_{RF}$, which is represented by the vector $u=[u_1, u_2, \ldots, u_{N_t}]^T$, $u_i$ is the probability of $f_i=1$, and $1-u_i$ is the probability of $f_i=-1$. The probability is initialized to $u^{(0)}=(\frac{1}{2})1_{N_t \times 1}$ because there is no priori information.

6. The apparatus according to claim 5, wherein the apparatus is further configured to generate S random vectors $\bar{g}^s$ and $f^s$, s=1,2, ..., S, are generated according to $p^{(m)}$ and $u^{(m)}$, respectively, where m represents the m-th iteration; and the value assignation in the analog beamformer is determined by $(F_{RF})_{i,g_j}=f_i$, when the i-th antenna is in the j-th antenna subarray.

7. The apparatus according to claim 5, wherein the digital precoder is a zero forcing (ZF) linear precoder, the matrix is determined by:

$F_{BB}=c_n(HF_{RF})^\dagger$, where $H=[h_1^T \ldots h_K^T]^T$, $h_k$ is the channel matrix between the base station and the user k, and $c_n$ is computed to satisfy the power constraint such that $\|F\|_F^2=\|F_{RF}F_{BB}\|_F^2=E_T$, where $E_T$ represents the total available power for transmission.

8. The apparatus according to claim 5, wherein S hybrid precoders are calculated as $F^s=F_{RF}{}^s F_{BB}{}^s$, s=1, ..., S; and then, the achievable sum-rate $R(F^s)$ is computed by making use of:

$$R = \sum_{k=1}^{K}\log_2\left(1 + \frac{\|h_k F_{:,k}\|^2}{\sum_{j\neq k}^{K}\|h_k F_{:,j}\|^2 + \sigma_n^2}\right)$$

then, $S_{elite}$ candidates are taken that correspond to the largest sum-rate values such that $R(F^1) > R(F^2) > \ldots > R(F^{S_{elite}})$.

9. The apparatus according to claim 6, wherein weights of the $S_{elite}$ candidates are computed as follows;

$$w_s = \frac{S_{elite}|R(F^s) - R(F^{S_{elite}})|}{\sum_{s=1}^{S_{elite}}|R(F^s) - R(F^{S_{elite}})|}.$$

10. The apparatus according to claim 5, wherein the probabilities related to the $N_tN$ switches are updated by:

$$p_j^{(m+1)} = \frac{\sum_{s=1}^{S_{slite}} w_s \bar{g}_j}{\sum_{s=1}^{S_{slite}} w_s} \text{ and } u_i^{(m+1)} = \frac{\sum_{s=1}^{S_{slite}} w_s(f_i+1)}{2\sum_{s=1}^{S_{slite}} w_s}$$

up to reach an established number of iterations; then, the optimum analog beamformer, $F_{RF}{}^*$, is taken from the best sum-rate value among all iterations.

11. The apparatus according to claim 5, wherein the adequate values of the switches in the architecture of the proposed hybrid precoder can be also obtained by machine learning, deep learning, reinforcement learning, or any algorithm from Intelligence Artificial area.

12. The method for performing multiple user multiple input multiple output (MU-MIMO) communication with the proposed apparatus comprises:

processing signals digitally with a digital precoder;

processing the digitally processed signals with a plurality of radiofrequency (RF) chains;

processing the signals analogically with an analog precoder, wherein the analog precoder comprises:

a plurality of antennas for transmitting the signals processed by the proposed hybrid precoder, the plurality of antennas is grouped, allowing for the building of the antenna array can be made by several subarrays of antennas;

wherein in the antennas' subarray, each antenna is connected to a two-way switch, whose terminals are connected to a phase inverter and a multiple-way switch. The other terminal of the phase inverter is connected to the multiple-way switch; and the number of terminals of the multiple-way switch is equal to the number of the plurality of RF chains such that each terminal is connected to an RF chain and each antenna subarray is switchable among the plurality of RF chains.

13. A system performing multiple user multiple input multiple output (MU-MIMO) communication comprises a processor and a memory, comprising computer readable instructions that, when executed by the processor, causes the processor to perform the method according to claim 11.

14. A non-transitory computer readable storage medium, storing computer readable instructions that, when executed by a processor, causes the processor to perform the method according to claim 11.

* * * * *